United States Patent [19]

Campanella

[11] Patent Number: 4,809,566

[45] Date of Patent: Mar. 7, 1989

[54] INSULATION STRIPPING COILER FOR WIRE, CABLE OR THE LIKE

[76] Inventor: Charles L. Campanella, 1812 Brendler Way, Modesto, Calif. 94501

[21] Appl. No.: 171,020

[22] Filed: Mar. 21, 1988

[51] Int. Cl.$^4$ ............................................. H02G 1/12
[52] U.S. Cl. .................................... 81/9.51; 29/403.3
[58] Field of Search ............ 81/9.51; 29/403.3, 403.1, 29/564.4; 83/924

[56] References Cited

U.S. PATENT DOCUMENTS

| | | | |
|---|---|---|---|
| 1,052,271 | 2/1913 | Pessin | 81/9.51 |
| 2,485,518 | 10/1949 | Vermette | 81/9.51 |
| 2,951,402 | 9/1960 | Adams et al. | 81/9.51 |
| 3,309,947 | 3/1967 | Denney | 81/9.51 |
| 3,329,046 | 7/1967 | Hilton | 81/9.51 |
| 3,977,277 | 8/1976 | Baston et al. | 81/9.51 |
| 4,181,047 | 1/1980 | Bitting et al. | 81/9.51 |

Primary Examiner—Roscoe V. Parker
Attorney, Agent, or Firm—Harris Zimmerman; Howard Cohen

[57] ABSTRACT

Recovery of the metal content of salvaged electrical wire, cable or the like is facilitated by a motor driven apparatus in which the wire or cable is fed on to a revolving drum through a notch in a linear cutting element that extends in parallel relationship with the drum. The notch defines a cutting edge which separates one portion of the insulation from another portion and from the metal core. The cutting element is longitudinally slidable relative to the drum enabling the operator to wind successive turns onto successive adjacent locations on the drum by exerting sideward pressure on the wire, cable or the like as it approaches the notch in the cutting element. The coils of stripped wire or the like may then be removed from the drum for reprocessing of the metal.

23 Claims, 9 Drawing Sheets

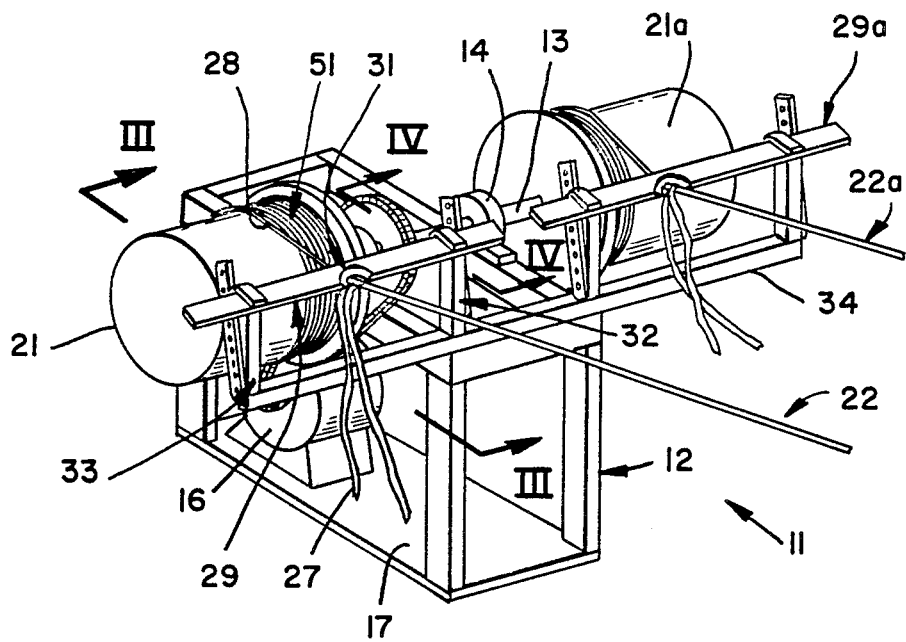
FIG _ 1
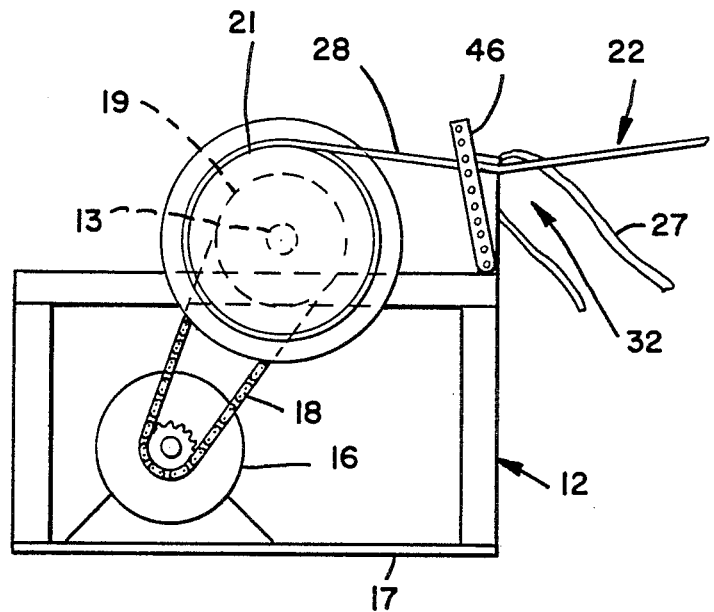
FIG _ 2

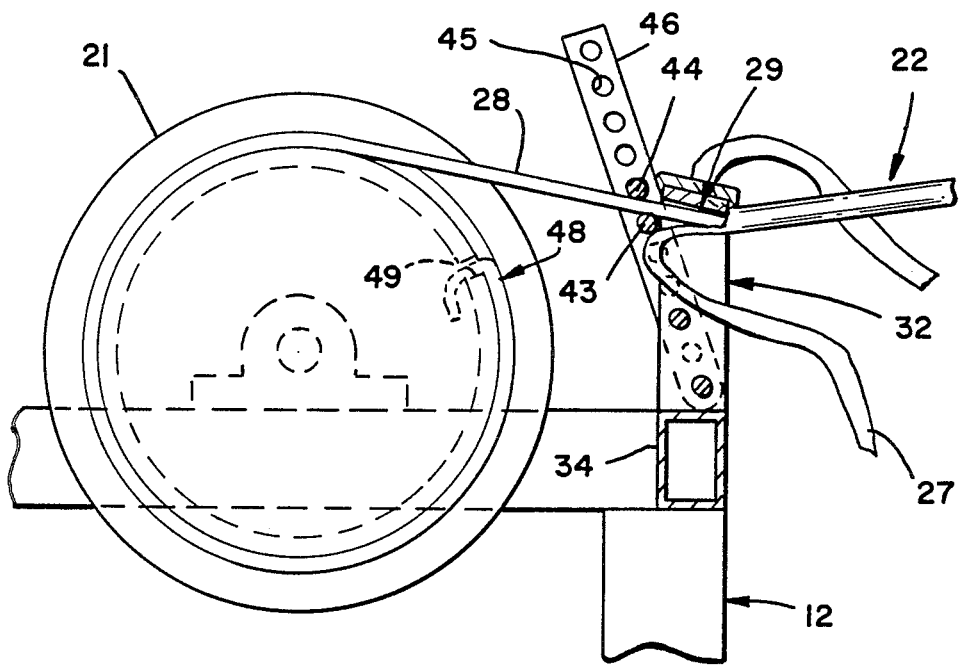
FIG _ 3
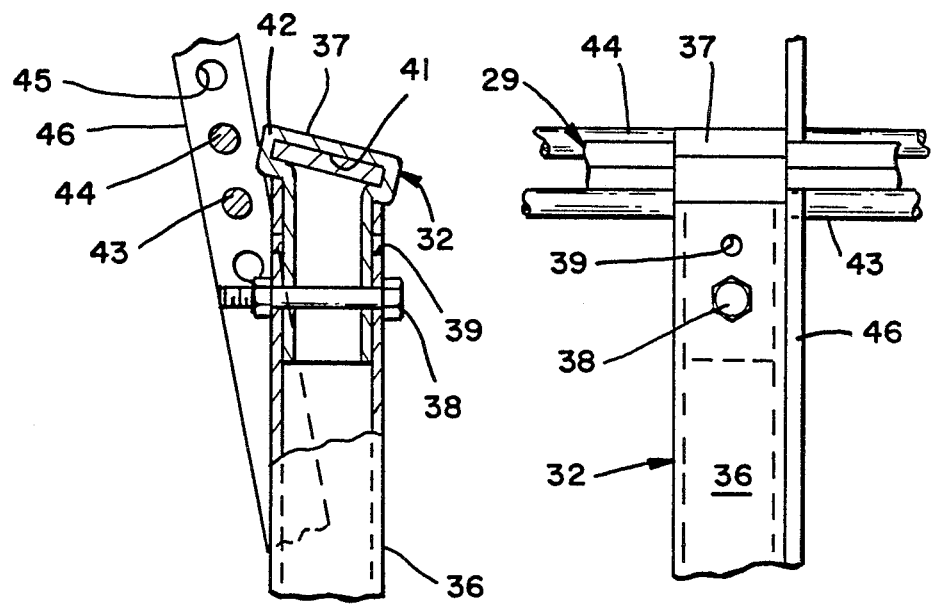
FIG _ 4   FIG _ 5

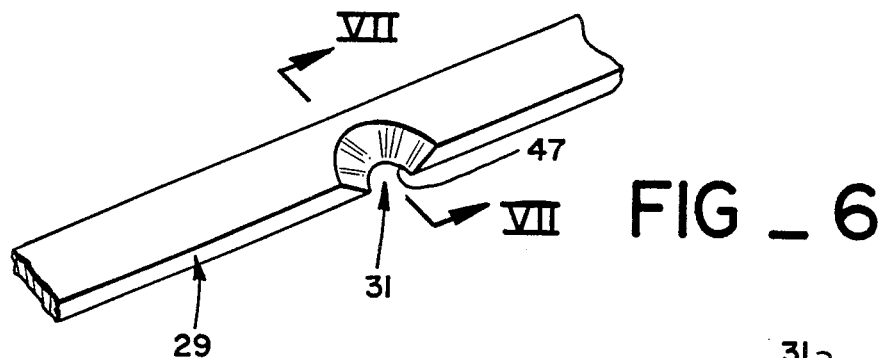
FIG _ 6
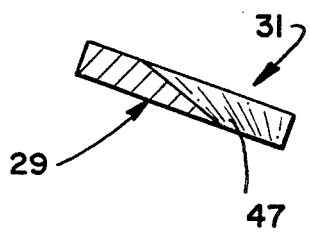
FIG _ 7
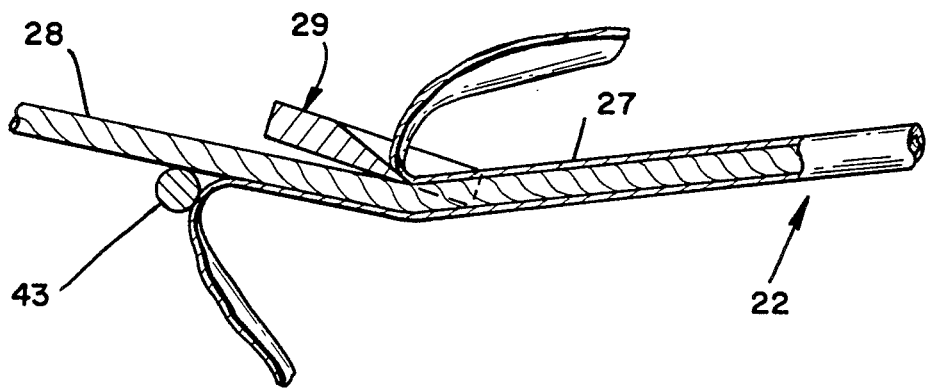
FIG _ 8
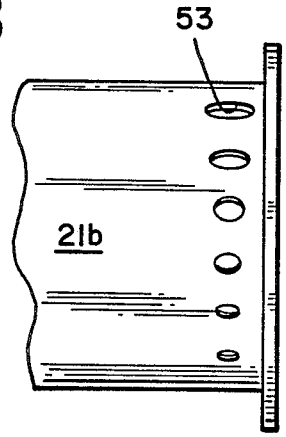
FIG _ 11

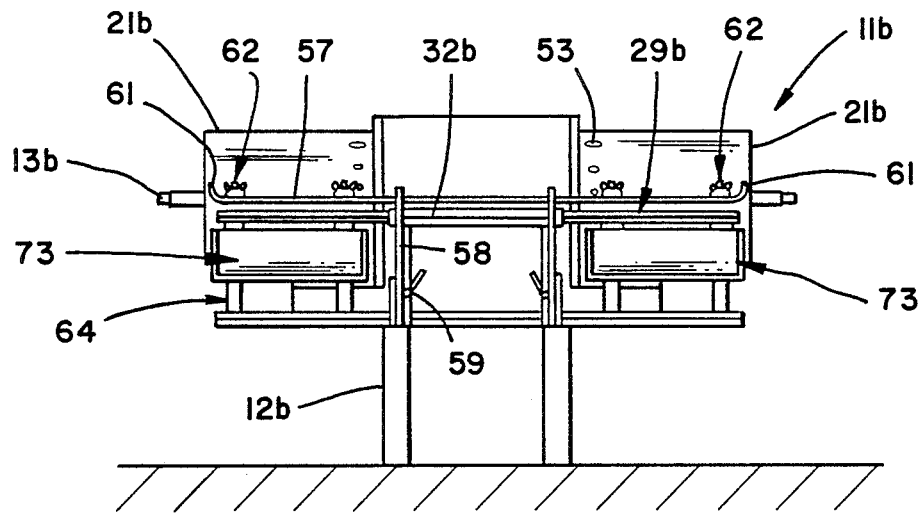
FIG _ 9
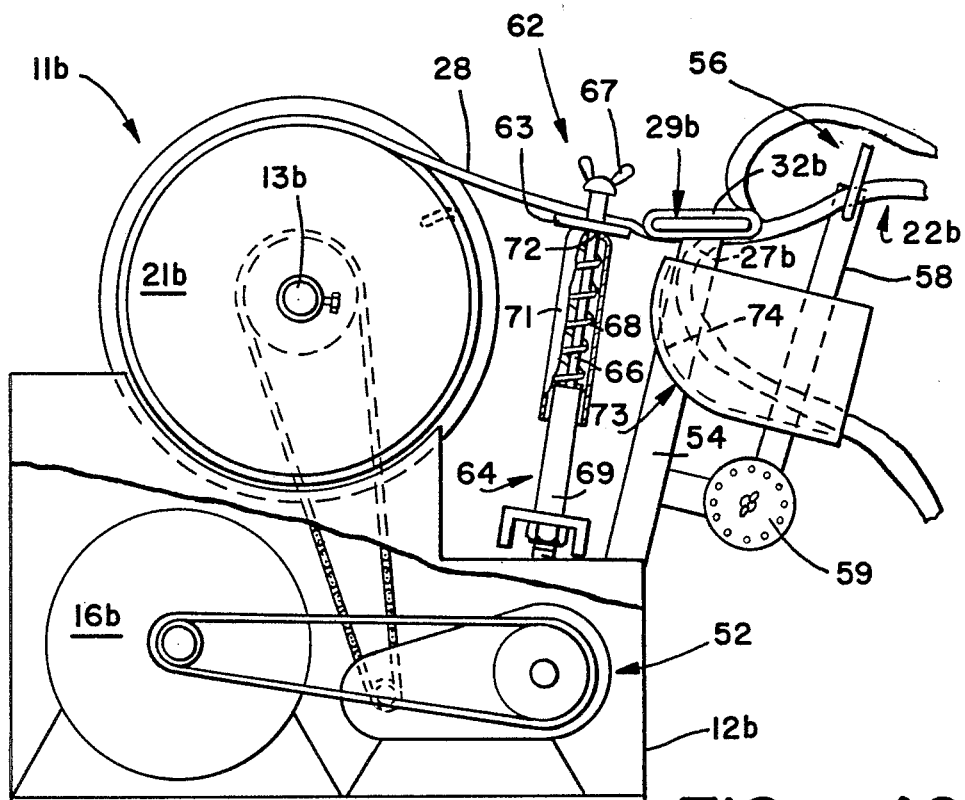
FIG _ 10

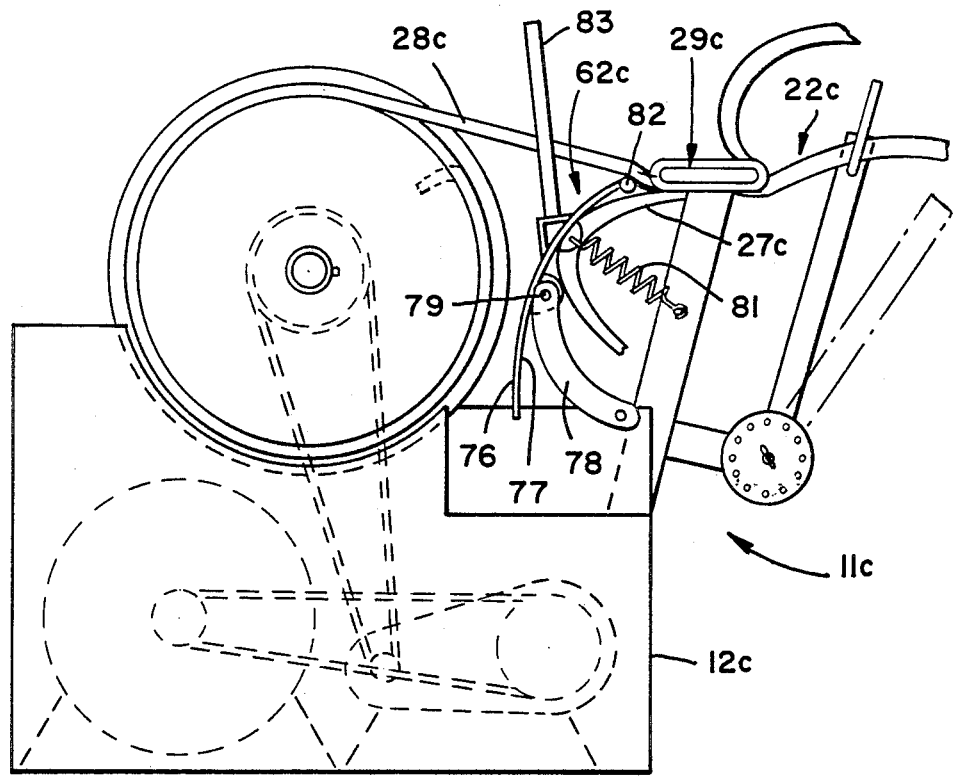
FIG _ 13
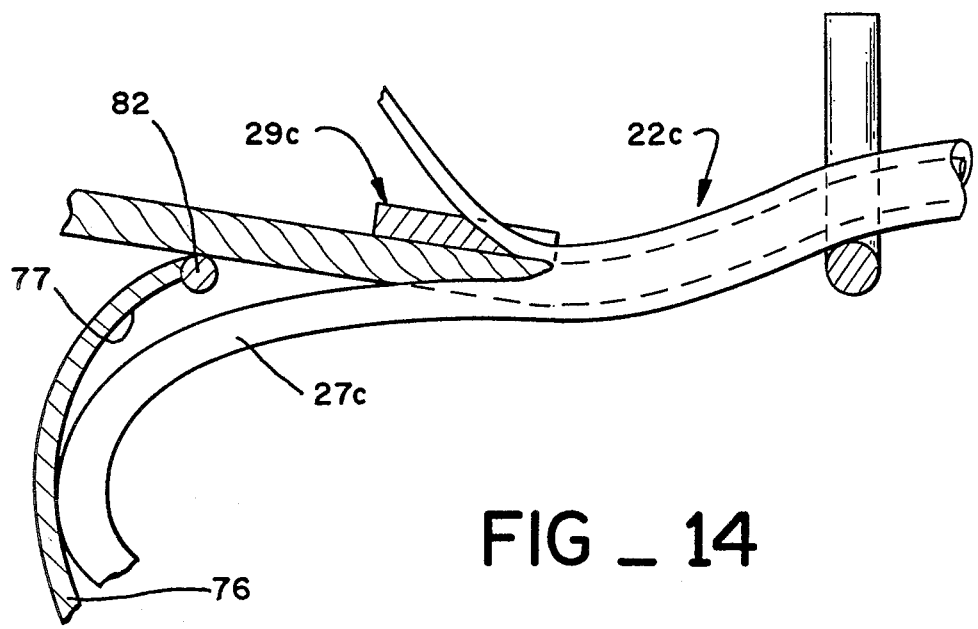
FIG _ 14

FIG — 16

INSULATION STRIPPING COILER FOR WIRE, CABLE OR THE LIKE

TECHNICAL FIELD

This invention relates to the recovery of metal from used or damaged electrical wiring and more particularly to apparatus which simultaneously cuts and peels insulation or other sheathing from the metal core of wire, cable or the like while forming the core into a coil.

BACKGROUND OF THE INVENTION

Demolishing of buildings or other electrically wired structures frequently produces large quantities of used electrical wire, cable or the like. Such wire or cable is typically unsuitable for reuse but contains substantial amounts of valuable metal, such as copper for example, which can be salvaged for further usage.

Recovery of the metal content of insulated electrical wire is also practiced in the manufacture of such wire. Specific lots of newly made wire may be rejected during quality control inspection because of excessive dimensional variations, incipient breaks or other reasons. It is advantageous if the metal content of such lots is recovered for reprocessing.

Recycling of the metal content of electrical wiring requires removal or stripping of the insulation sheath from the metal core. Removal of the insulation with hand tools is a slow and tedious operation and may not, as a practical matter, be economically feasible.

A number of motor driven wire stripping mechanisms have heretofore been developed to enable rapid and efficient recovery of metal. Typically the insulated wire is travelled from a feed-out spool through wire positioning guides to a cutting tool which slits the insulation and then through a stripping cone which peels away the insulation. The stripped metal core is then wound onto a drum, spool or the like by a winding mechanism.

Prior powered wire strippers of the above discussed kind, typically designed for high volume production in wire manufacturing plants, have been undesirably complex, bulky and costly. Many are essentially permanent installations within a factory and cannot conveniently be moved about to temporary locations such as, for example, the site of a building which is being demolished.

Recovery of metal from insulated wire would be greatly facilitated under many circumstances by a compact and relatively inexpensive powered wire stripping and winding mechanism of less complex construction. Preferably the mechanism should be capable of processing batches of wire and stranded cable that may have widely differing diameters.

The present invention is directed to overcoming one or more of the problems discussed above.

SUMMARY OF THE INVENTION

In one aspect, the present invention provides apparatus for removing insulation or other sheathing from the core of a wire, cable or the like. The apparatus includes a rotatable drum for receiving the core following removal of the insulation and drive means for turning the drum to wind the core on the drum. A cutting element has a notch through which the wire, cable or the like travels as it is fed towards the drum, the notch having a cutting edge proportioned to cut the insulation or other sheathing into two strip portions of sheathing as the core travels through the notch and being shaped to peel one portion of the cut insulation or other sheathing away from the other portion. Cutting element support means enable movement of the cutting element in a direction parallel to the axis of rotation of the drum as the core is being wound on to the drum.

In another aspect, the invention provides apparatus for stripping insulation or the like from electrical wire or the like which includes a support frame supporting a rotatable drive shaft, a drive motor coupled to the shaft and a cylindrical drum disposed in coaxial relationship with the drive shaft and which rotates with the shaft to enable winding of the wire or the like onto the drum. A linear cutting element is spaced apart from the drum and extends in parallel relationship with the drum. A notch in the cutting element defines a cutting edge which is shaped to receive the wire or the like as it travels towards the drum and to cut the insulation from the wire. The apparatus further includes means for supporting the linear cutting element that also enables longitudinal sliding movement of the element in response to forces exerted on the element through the electrical wire or the like.

The invention enables an operator to feed wire onto a rotating drum through a slidable cutting element which both cuts the insulation and peels insulation from the metal core. The operator may cause shifting of the cutting element relative to the drum to wind successive turns of the stripped core on to successive adjacent regions of the drum by exerting slight sidewise pressure on the incoming insulated wire as it is being fed towards the cutting element notch. The apparatus can be structurally uncomplicated, compact and inexpensive as it relies in part on the operator, rather than complex mechanisms, to feed and position the wire but does not require that the operator supply the power needed to strip and coil the wire. In the preferred form, the apparatus can easily be adjusted to process wire or cable of any of a variety of different diameters. Other advantages of the invention will be apparent from the following description of preferred embodiments.

BRIEF DESCRIPTION OF THE DRAWINGS

FIG. 1 is a perspective view depicting wire stripping and winding apparatus in accordance with an embodiment of the invention.

FIG. 2 is a side view of the apparatus of the preceding figure.

FIG. 3 is a section view of a portion of the apparatus of FIG. 1 taken along line III—III thereof.

FIG. 4 is a section view of a portion of the apparatus of FIG. 1 taken along line IV—IV thereof.

FIG. 5 is a frontal view of the portion of the apparatus shown in FIG. 4.

FIG. 6 is a perspective view of a portion of a cutting element component of the apparatus of the preceding figures.

FIG. 7 is a cross section view of the cutting element of FIG. 6 taken along line VII—VII thereof.

FIG. 8 is a view, partially in section, depicting the interaction of the cutting element with wire which is to be stripped.

FIG. 9 is a front elevation view of a second embodiment of the wire stripping and winding apparatus.

FIG. 10 is a side view of the second embodiment of the invention, portions of the structure being broken out to expose internal components.

FIG. 11 is an elevation view of one end portion of a wire receiving drum of the second embodiment of the invention.

FIG. 13 is a side elevation view of a third embodiment of the invention.

FIG. 14 is an elevation section view of the cutting element and adjacent components of the embodiment depicted in FIG. 13.

FIG. 16 is an elevation section view of a portion of the embodiment of FIG. 15 showing the position of certain elements during stripping of small diameter wire or the like.

FIG. 17 is an elevation section view corresponding generally to FIG. 16 but showing the changed position of certain elements during stripping of relatively thick cable or the like.

DETAILED DESCRIPTION OF THE PREFERRED EMBODIMENTS

Figure 12:
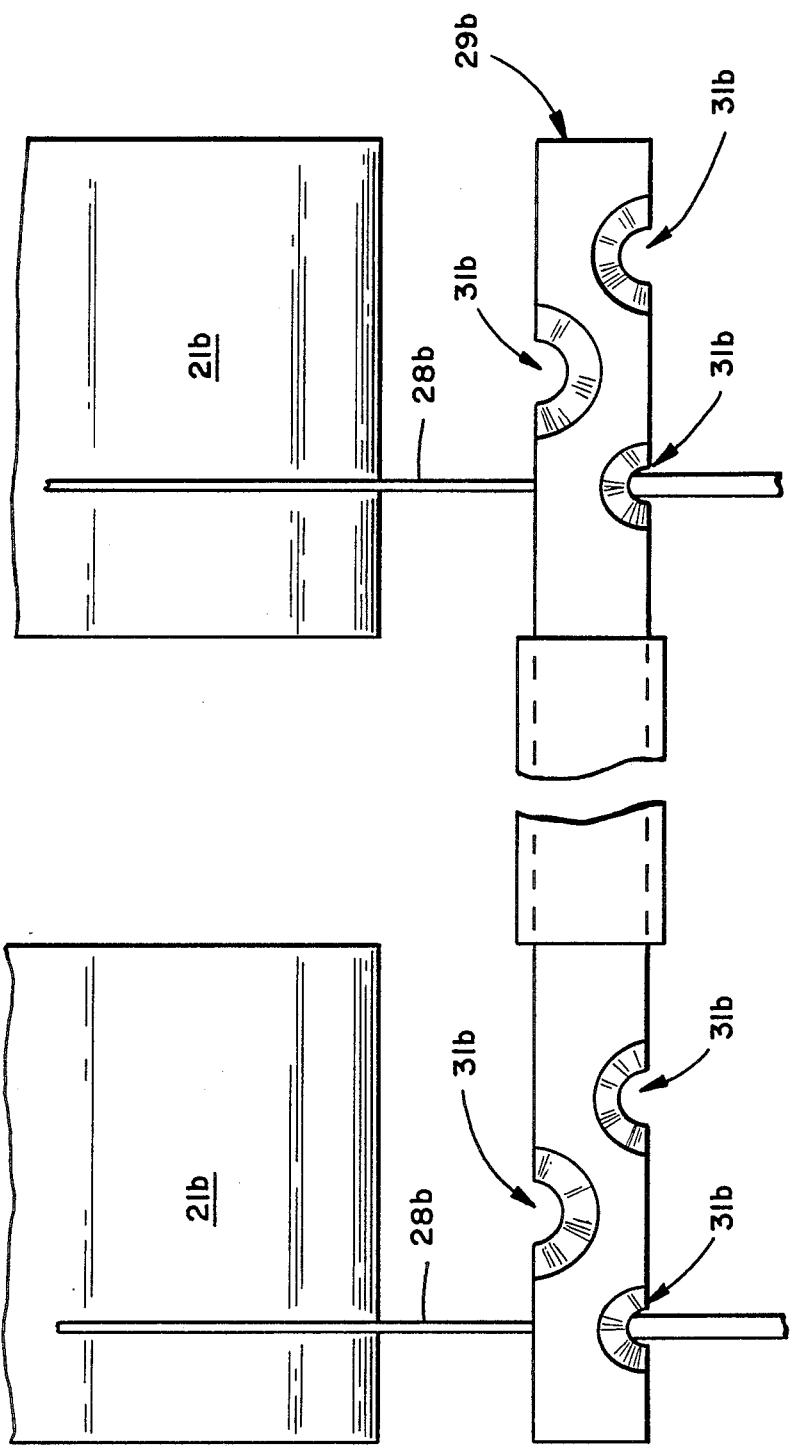
FIG. 12 is a foreshortened plan view of the cutting element component of the embodiment of FIGS. 9 to 11.

Referring initially to FIG. 1 of the drawings, a wire stripping and coiling apparatus 11 in accordance with this particular embodiment of the invention has a rectangular support frame 12 supporting a rotatable drive shaft 13. Shaft 13 extends transversely with respect to frame 12 at a location immediately above the frame and has a length greater than the width of the frame so that the shaft extends outward at each side of the frame. Bearings 14 serve to journal the shaft 13 to the frame.

Referring to FIGS. 1 and 2 in conjunction, a drive motor 16 is secured to a flat base member 17 of frame 12 and is of the electrical form in this example although other types of motor may also be used. Rotary drive from motor 16 is transmitted to drive shaft 13 by an endless chain 18 which engages a drive gear 19 that is secured to the shaft in coaxial relationship with the shaft.

A first spool or drum 21 for receiving stripped wire 22 is secured to shaft 13, in coaxial relationship with the shaft, at one side of the frame 12.

Insulation 27 is simultaneously cut and peeled from the metal core 28 of the wire 22, as it travels towards the drum 21, by a cutting element 29. Cutting element 29 has a flat linear configuration and is oriented to extend in parallel relationship with the axis of rotation of the drum 21 as defined by drive shaft 13. The cutting element 29 is positioned in front of drum 21 at a level above that of the axis of rotation and below the level of the top of the drum. Cutting element 29 has a length which exceeds the length of the region of drum 21 on which stripped wire 22 is to be wound, the length of the element preferably being at least twice the length of that region. A notch 31 at the center of the forward edge of cutting element 29, to be hereinafter described in more detail, performs the cutting and peeling of the insulation 27.

Cutting element 29 is supported at the above described position and in the above described orientation by first and second cutting element guides 32 and 33 which enable longitudinal sliding movement of the cutting element relative to the drum 21. Guides 32 and 33 extend upward from a cross member 34 that is secured to frame 12 and which projects outwardly at each side of the frame. The guides 32 and 33 are situated at opposite sides of the notch 31 of cutting element 29 and are spaced apart a distance which is less than the length of the cutting element but at least equal to the length of the region of drum 21 that is to receive wound wire core 28.

Referring jointly to FIGS. 3, 4 and 5, the cutting element guides of this embodiment, such as guide 32, have a hollow rectangular cross section and include a lower member 36 which is welded to cross member 34. An upper member 37 of slightly smaller cross sectional area fits into the top of the lower member 36 and is secured in place by a cross bolt 38. The lower member 36 may have two or more openings 39 for receiving the cross bolt 38, situtated at different levels, to enable adjustment of the height of cutting element 29.

The cutting element 29 extends through a conforming slot 41 formed by an enlargement 42 at the top of the upper member 36. This enables longitudinal sliding movement of the cutting element 29 while holding the element in parallel relationship with the axis of rotation of drum 21 at a location in front of the drum as previously described. Slot 41 is inclined in order to hold the cutting element 29 in a tilted position at which the back edge of the cutting element is somewhat more elevated than the front edge.

A first cross rod 43 extends in parallel relationship to the cutting element 29 at a location slightly below the back edge of the cutting element in order to hold the metal core 28 of the wire 22 against the underside of cutting element 29 and to assure peeling of all cut insulation 27 away from the core. An additional parallel cross rod 44 may be disposed above cross rod 43, to resist unwinding of wound metal core 28 from drum 21 when the apparatus is stopped in instances where the core material exhibits a tendency to unwind. Cross rods 43 and 44 are supported by rod supports 46 which extend upward and backward from each guide support 32. Supports 46 preferably have a series of spaced apart openings 45, at successively higher elevations to enable selection of the location of the cross rods 43 and 44 to accomodate to wire or cable of different diameters.

Referring to FIGS. 6, 7 and 8 in conjunction, the notch 31 of cutting element 29 is a beveled indentation in the forward edge of the element forming a curved cutting edge 47 at the base of the element. Edge 47 is shaped to cut away the upper half of the insulation 27 of wire or cable 22 as it is drawn through the notch 31 while being held at a small acute angle relative to the plane of the cutting edge. A series of cutting elements 29 may be provided, each having a differently proportioned cutting edge 47, to accommodate to wires or cables 22 of different diameters.

In operation, with reference again to FIG. 3, the end portion 48 of wire 22 which is to be processed is stripped manually with a knife or other hand tool and is coupled to drum 21 by hooking of the end of the portion 48 into a small slot 49 at one end of the surface of the drum. Some initial rotation of the drum 21 then winds the wire end portion 48 on to the drum and frictional forces than further couple the wire to the drum.

Referring again to FIG. 1, operation of motor 16 then winds successive portions of the wire or cable 22 on to drum 21. An operator holds the wire 22 in position to cause the wire to be fed through notch 31 as it advances towards the drum. Referring agan to FIG. 8, cutting edge 47 then cuts the upper half of insulation 27 from the lower half and also peels the upper half away from the metal core 28. Cross rod 43 assures that the lower half of the insulation 27 also separates from the metal core 28.

Referring again to FIG. 1, the operator may cause successive turns of core 28 to be wound on to successively different portions of the drum 21 by exerting sideward pressure on wire 22 as it is being fed towards notch 31 as this results in longitudinal sliding movement of the cutting element 29 relative to the drum in the direction of the applied pressure. Such movement may be periodically reversed by reversing the direction of the pressure to form a layered winding on the drum 21. The ability of the cutting element 29 to shift longitudinally also aids in retaining the wire 22 in notch 31 at times when the pattern of winding onto drum 21 is such that the drum exerts a sideward pull on the wire. The cutting element 29 shifts in response to such forces in a direction which eliminates the sideward force.

Following stripping and winding of the wire 22, motor 16 is stopped and the coil 51 of stripped wire is slid off of the drum 21 and wrapped with tape or a strand of wire to maintain it in the coiled form until it is melted down or otherwise reclaimed.

The particular embodiment of the invention which has been herein described has an additional drum 21a on drive shaft 13, at the opposite side of support frame 12 from drum 21, and an additional cutting element 29a supported and positioned for coaction with the additional drum as hereinbefore described. This enables the simultaneous stripping and winding of two lengths of wire or cable 22 and 22a. The apparatus 11 may be constructed with a single drum 21 and cutting element 29 which may then be centered over the support frame 12 if desired. Alternately, the apparatus 11 may be provided with a larger number of drums 21 and cutting elements 29 to increase productivity.

Referring now to FIGS. 9 and 10 in conjunction, a second embodiment 11b of the wire stripping and coiling apparatus has a construction generally similar to that which has been previously described but includes additional features which make the apparatus more readily adaptable to processing batches of wire or stranded cable that have greatly different diameters.

The apparatus 11b again has a support frame 12b and a transverse drive shaft 13b driven by a motor 16b which components may be similar to those previously described although the motor is coupled to the drive shaft through a speed reducing unit 52 in this example. One of a pair of cylindrical drums 21b is supported on each end of the drive shaft 13 for receiving and coiling stripped wire core 28b in the manner previously described.

Referring now to FIG. 11, the drums 21b differ from those previously described in that the surface of each drum is penetrated by a series of openings 53 located near one end of the drum, the openings being spaced apart around the circumference of the drum. Openings 53 are of progressively different diameter in order to receive and engage hooked ends of wires or cables having different diameters. In the case of very large diameter stranded cables, which may be difficult to bend into a hook, one or more individual strands of the cable can be bent into a hook shape and inserted into an appropriate one of the openings 53.

Referring again to FIGS. 9 and 10, this embodiment also differs from that previously described in that only a single cutting element 29b is used at any given time, the cutting element being sufficiently long to extend in front of both drums 21b. Cutting element 29b extends through a sleeve-like guide 32b situated at the front of the central portion of the apparatus 11b and which enables longitudinal sliding movement of the cutting element relative to the guide in response to lateral forces exerted on the wire 22b as previously described. Guide 32b is secured to support frame 12b by a pair of spaced apart arms 54 which extend downward and backward from opposite ends of the guide to the frame.

Referring to FIG. 12, the Cutting element 29b of this embodiment also differs from that previously described by having a plurality of the beveled cutting notches 31b. The notches 31b are located at each end region of the cutting element 29b, there being three such notches at each end region in this embodiment. The notches 31b which are located at the same end of the cutting element are of different proportions to facilitate processing of wires or cables of different sizes at that end. Each end region of the cutting element 29b has notches of the same particular sizes in instances where the element is designed for simultaneous processing of the same sized wire at both end regions. Corresponding notches of a particular size at both end regions of the the cutting element 29b are located to be at corresponding positions relative to their respective drums 21b. Thus longitudinal sliding movement of the cutting element 29b during operation causes the stripped wires 2Bb to be wound onto corresponding locations on the two drums 21b at any given time.

The cutting element 29b may easily be withdrawn from guide 32b and then be turned end to end for reinsertion into the guide. Thus notches 31b can be provided along both edges of the cutting element 29b. In the present example there is a single notch 31b at one edge of the cutting element 29b at each end region of the element and a pair of the notches at the opposite edge at each end region.

Referring again to FIGS. 9 and 10, this embodiment of the invention is further provided with a wire guide 56 which assures that the wire 22b is fed to the cutting element 29b at the proper inclination and thereby relieves the operator of that task.

Wire guide 56 includes a rod 57 which extends in parallel relationship with the cutting element 29b at a location in front of the cutting element and which has a length sufficient to span both drums 21b except for the extreme outer end portions of the drums. In operation, the wire 22b which is to be stripped rides over the rod 57 and then under the cutting element 29b in the manner previously described.

Rod 57 is positioned at an elevation where it causes the wire 22b to be at a small angle relative to the plane of cutting element 29b as the wire approaches the cutting element which orientation assures that the insulation is stripped away in the manner previously described. Rod 57 is preferably attached to the support frame 12b of the apparatus through pivotable arms 58 and clampable pivot connections 59 to enable the rod to be selectively raised or lowered to accomodate to wire of different diameters. The rod 57 also preferably has upturned ends 61 which prevent an inadvertent mispositioning of the wire 22b at a location where the wire would not wind onto the drums 21b.

Optimum orientation of the wire 22b relative to the cutting element 29b is further provided for by a pair of spring tensioned wire positioners 62 each of which is located between the cutting element 29b and a separate one of the drums 21b. Each such positioner 62 includes a flat plate 63 which extends in parallel relationship with the cutting element 29b and one of the drums 21b at a location immediately behind the cutting element. Each such positioner 62 also includes a pair of shafts 64 secured to frame 12b which have upper end portions 66 of reduced diameter that extend through openings in the opposite ends of the plate 63, a wing nut 67 being threaded onto the upper end of each shaft portion 66 to prevent release of the plate from the shafts.

A compression spring 68 is disposed in coaxial relationship with the upper end portion 66 of each shaft 64 and abuts the upper end of the broad lower portion 69 of the shaft. Spring 68 is enclosed by a protective sleeve 71 into which the lower portion 69 of shaft 64 extends in telescoping relationship, the sleeve having an inwardly extending lip 72 which extends between the upper end of spring 68 and the underside of plate 63.

Shaft 64 and spring 68 are proportioned to normally hold the upper forward edge of plate 63 at a level slightly above that of the lower rear edge of cutting element 29b. During operation, the stripped wire core 28 emerging from beneath the cutting element 29b extends above the plate 63 which thus acts to hold the wire against the underside of the cutting element as is desirable for the most effective stripping operation. The plate 63 may be forced downward against the force of springs 68 to accommodate to wires or cable of thicker dimensions. The ability of plate 63 to move down against the spring force also has the effect of smoothing otherwise abrupt increases of tension in the wire core 28 that could result in breakage.

The embodiment 11b of FIGS. 9 and 10 includes a pair of chutes 73 each being disposed below the cutting element 29b in front of a separate one of the drums 21b. Each such chute 73 has a downwardly and forwardly curving floor 74 positioned to receive the lower portion of the sheathing 27 of wire 22b and to guide such stripped sheathing to a location in front of the apparatus 11b where it can be more easily removed.

FIGS. 13 and 14 depict an alternate form of spring tensioned wire positioner 62c which serves both to hold the wire core 28c against the underside of the cutting element 29c and to deflect stripped sheathing 27c towards the front of the apparatus 11c.

The wire positioner 62c of this embodiment includes a plate like member 76 extending across the front of the apparatus 11c at a location below and behind the cutting element 29c. Plate member 76 is has a curving profile forming a convex forward surface 77 which intercepts the lower portion of the stripped sheathing 27c and guides such sheathing in a downward and then forward direction. Plate member 76 is supported by arms 78 which are secured to the front region of frame 12c and which extend upward and backward to connect with the front 77 of the plate member through pivot joints 79 that enable the upper edge of the plate member to move towards and away from the back edge of cutting element 29c. A tension spring 81 is connected between the upper portion of plate member 76 and the cutting element supports 32c to urge the upper edge of the plate member towards the cutting element 29c.

During operation, the stripped wire core 28c which emerges from the underside of cutting element 29c rides over a rod 82 that extends along the top edge of plate member 76 and which is secured to the plate member. Thus the rod 82 acts to hold the wire 22c against the underside of the cutting element 29c in the optimum orientation for stripping. Rod 82 may be pivoted away from the cutting element 29c to the extent necessary to accommodate to larger sizes of wire or cable and also to facilitate initial insertion of a length of wire between the cutting element and rod. Such pivoting movement is facilitated by a lever 83 which extends upward from plate member 76 at the back of the plate member.

Other components of the embodiment of FIGS. 13 and 14 may be similar to those previously described with reference to FIGS. 9 and 10.

Figure 15:
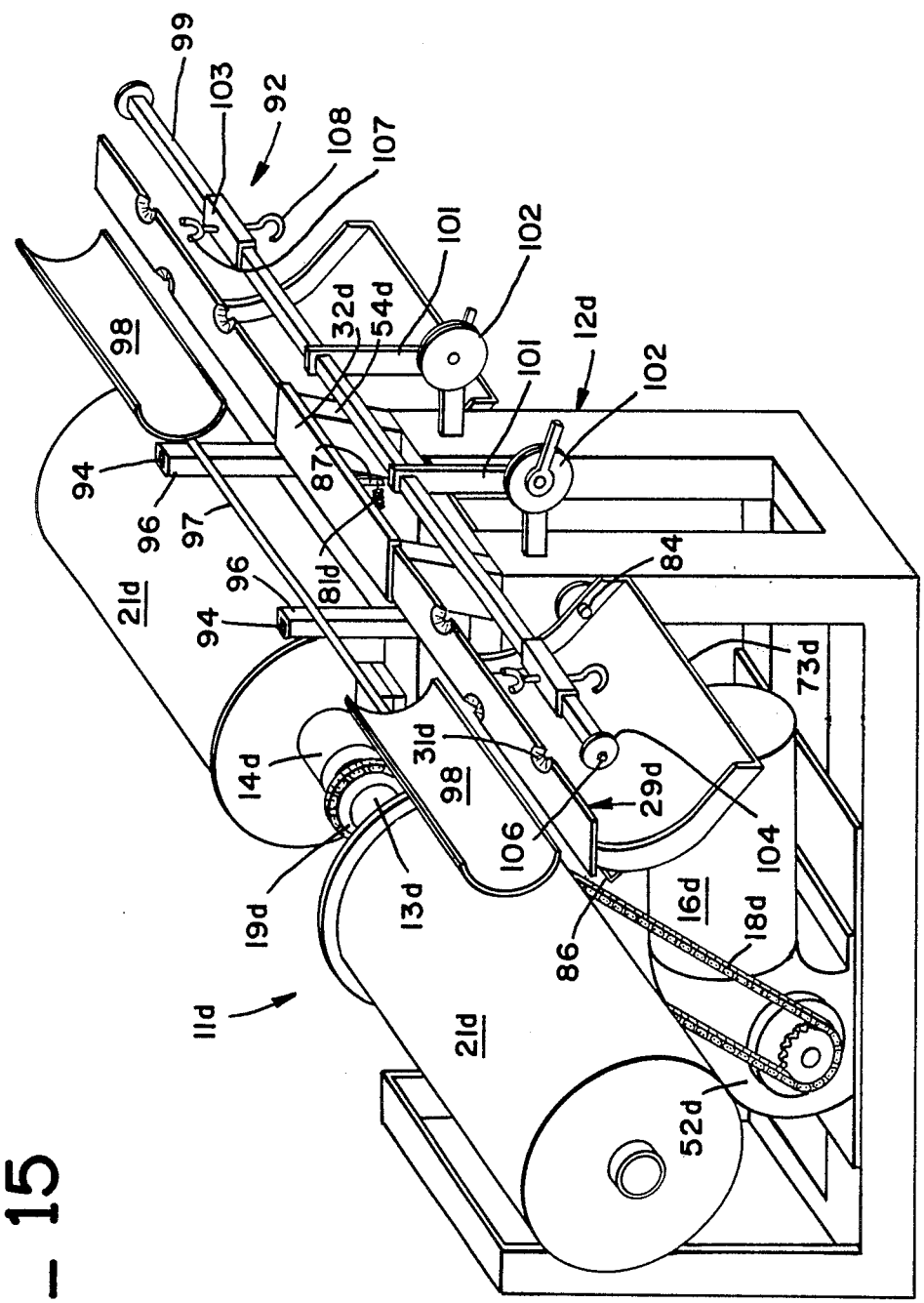
FIG. 15 is a perspective view of a fourth embodiment of the invention.
Figure 16:
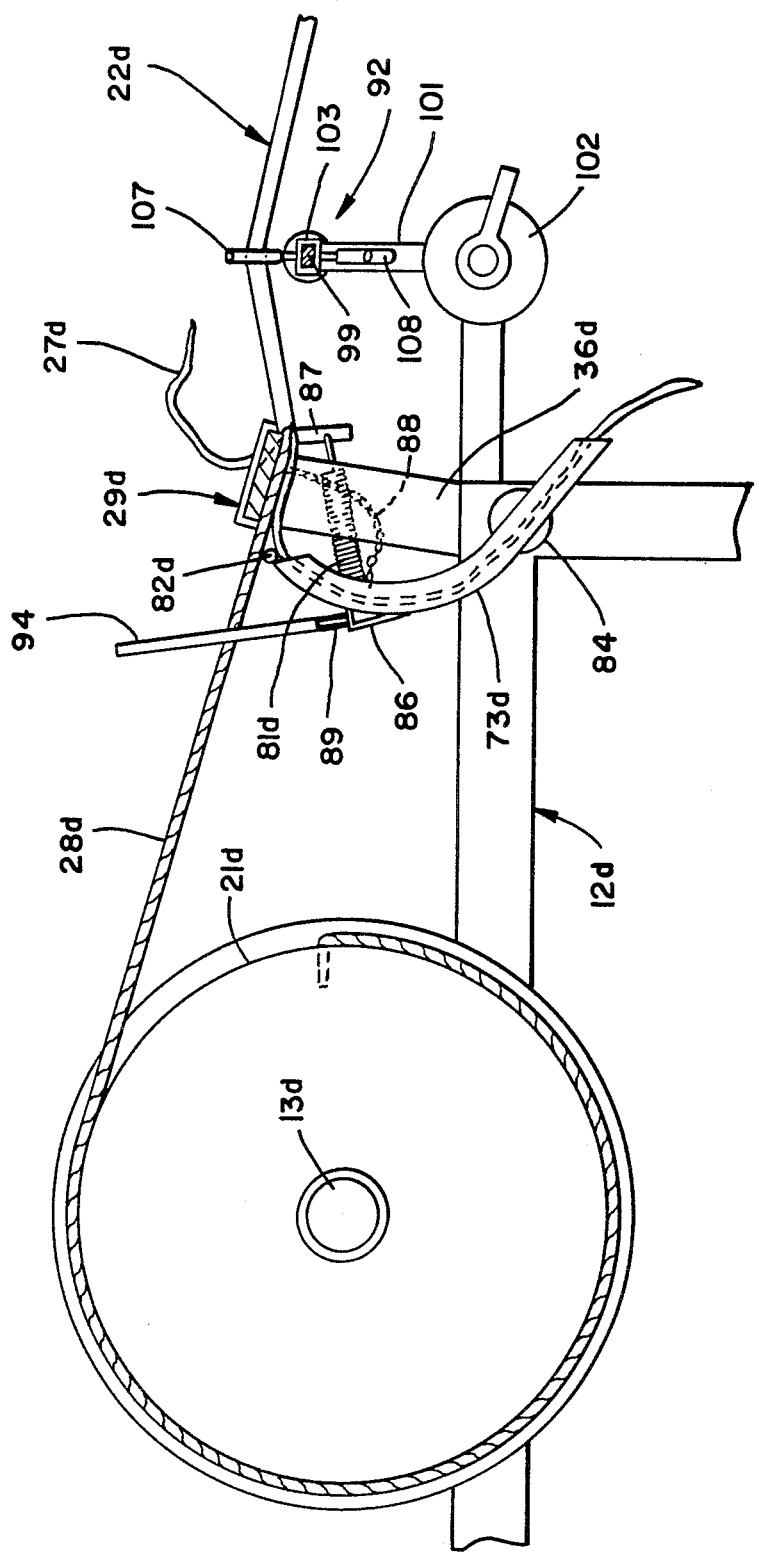
Figure 17:
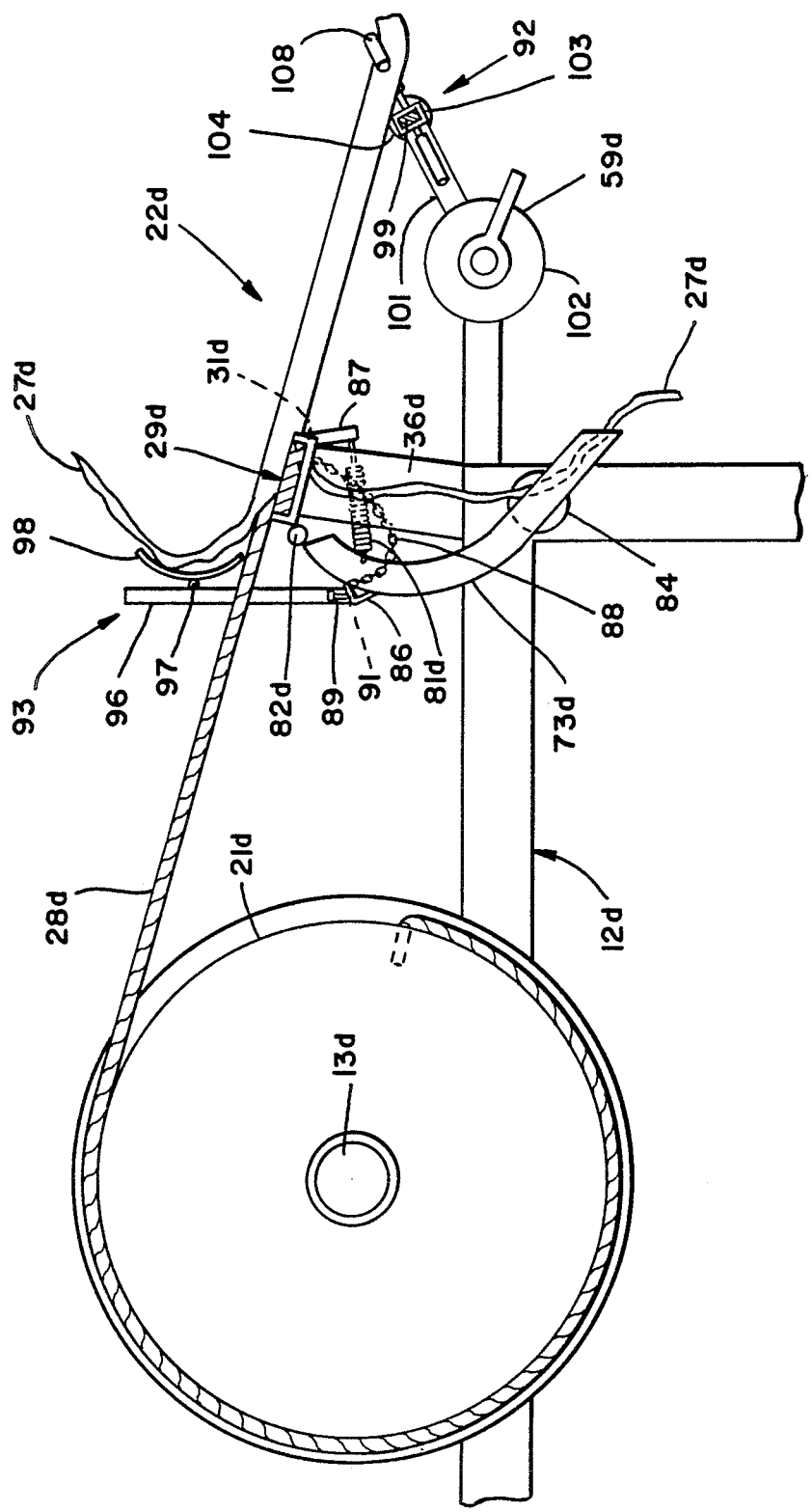

While the previously described embodiments are capable of processing wire or cable 22c of different diameters, the flexibility of wire or cable decreases as diameter increases. As the wire or cable 22c undergoes significant bending as it travels through the previously described embodiments, increased operator effort is needed to process large diameter material and at some relatively large diameter the wire or cable cannot flex sufficiently at the point of passage through notch 31c to maintain the optimum interaction with the cutting element. FIGS. 15, 16 and 17 depict another embodiment of the insulation stripping coiler 11d which facilitates the processing of large diameter material including very thick wire or cable while also being capable of processing small diameters.

Referring to FIG. 15 in particular, the apparatus 11d may be similar in many respects to that previously described and thus includes a frame 12d to which a horizontally extending shaft 13d is journalled by bearings 14d. As in the previously described embodiments, a pair of drums 21d are mounted on the opposite end portions of the shaft to receive stripped wire core and the shaft and drums are turned by a motor 16d through a speed reductions gearbox 52d and drive chain 18d which engages a gear 19d on the center of the shaft.

The cutting element 29d and cutting element guide 32d may be essentially similar to the corresponding elements of the last described embodiment. Thus cutting element 29d is a flat linear element of sufficient length to extend in front of both drums 21d and has cutting notches 31d at each end portion which may be of different sizes to accommodate differently sized wires. Guide 32d is a flattened sleeve through which the cutting element 29d extends and which is supported at the front of the apparatus 11, at a location between the drums 21d by arms 54d which extend to frame 12d. As in the previous embodiments, cutting element 29d is longitudinally slidable relative to the guide 32d.

Referring jointly to FIGS. 15 and 16, one of a pair of sheathing deflector plates 73d is disposed at each side of frame 12d below the notched regions of cutting element 29d. The lower portion of each plate 73d is coupled to frame 12d by a pivot joint 84 which enables the upper portion of the plate to pivot forwardly and backwardly relative to cutting element 29d. A horizontal rod 82d extends along and joins the two plates 73d in position to contact the lower back edge of cutting element guide 32d when the plates are pivoted to their most forward position. The plates 73d curve downwardly and forwardly from rod 82 to guide the lower portion of the stripped insulation 27d to the front of the apparatus 11d.

The two plates 73d are further unitized by a cross brace 86 which extends along the back of both plates and which is welded to each. A tension spring 81d has one end connected to the center of cross brace 86 and the other end coupled to a tab 87 which extends downward from cutting element guide 32d. Thus the plates 73d and rod 82 are spring biased towards the forward position at which the rod rides against the underside of wire core 28d and acts hold the wire in cutting notch 31d and also to assure separation of the lower portion of stripped insulation 27d from the core. Excessive pivoting of the rod 82 and plate 73d assembly in the backward direction, in response to impacts or some other force, is prevented by a chain 88 having one end secured to the underside of cutting element guide 32d and having a pin 89 at the other end which may be inserted in a passage 91 in cross brace 86.

Referring specifically to FIG. 16, the apparatus 11d is operated in essentially the same manner as the previously described embodiments when small diameter wire 22d is to be stripped and coiled. The wire 22d travels over a wire guide 92 which will hereinafter be described in more detail and then under cutting element 29d at the location of one of the notches 31d and then over rod 82d. This requires flexing of the wire 22d at the location of the notch 31d to an extent that can become difficult when relatively large diameter wire or cable is to be processed.

The problem is avoided when large diameter wire 22d is to be stripped by temporarily removing the cutting element 29d from guide 32d and turning it over after which the cutting element is reinserted into the guide. Referring now to FIG. 17 this causes the cutting edge of the notch 31d to be at the top surface of the cutting element. The apparatus 11d is then operated with the wire 22d traveling under wire guide 92 and over the cutting element 29d in a reversal of the former procedure. Flexing of the wire 22d at the location of the cutting element 29d may then be minimal or absent.

The wire diameter at which the mode of operation depicted in FIG. 17 becomes preferable to that shown in FIG. 16 is somewhat dependent on the type of wire. Typically, in the case of copper wire, diameters of $\frac{3}{8}$ inch and larger are traveled over the cutting element 29d in the manner shown in FIG. 17.

An additional sheathing deflector assembly 93 is added to the apparatus 11d during large diameter wire processing to assure separation of the upper portion of the severed sheathing from core 28d and to guide the upper portion towards the front of the apparatus where it can be allowed to accumulate for a period and then be easily removed. The cutting notch 31d itself provides these functions in the small diameter wire processing mode and in the previously described embodiments of the invention.

Referring to FIGS. 15 and 16 in conjunction, one of a pair of spaced apart posts 94 extends upward from cross brace 86 behind each end of the cutting element guide 32d in order to support the deflector assembly 93. Referring now to FIGS. 15 and 17, the assembly 93 includes a pair of pair of parallel sleeves 96 which can be fitted onto posts 94 in telescoping relationship and a cross rod 97 which extends between the sleeves and beyond to support a pair of upper deflector plates 98. One of the deflector plates 98, which have concave forward surfaces, is situated in front of each drum 21d with the lower edge of the plate being located to ride along the top of the wire Core 28d behind cutting element 29d.

The lower edge of the deflector plate 98 separates the upper portion of the severed sheathing 27d from core 28d and guides the material upward and forwardly where it may drop and accumulate in front of the apparatus 11d. The assembly 93 may rise and fall as necessary to accommodate to wires of different diameter and to buildup of the wound wire on drums 21d owing to the telescoping relationship of sleeves 96 and posts 94.

The assembly 93 may also be easily lifted off of the posts 94 and removed when small diameter wire is to be processed in the manner described with reference to FIG. 16.

The wire guide 92 of this embodiment has a specialized construction which adapts to the two different modes of operation described above. In particular, with reference jointly to FIGS. 15 and 16, the wire guide 92 includes a horizontally extending cross rod 99 located forward from cutting element 29d and which is coupled to frame 12d by jointed arms 101 having selectively lockable pivot joints 102 that enable adjustment of the position of the cross rod relative to the cutting element. Cross rod 99 has a rectangular cross section and one of a pair of sleeve like sliders 103 is travelable along each opposite end portion of the rod. Sliders 103 also have a rectangular cross section to prevent turning of the sliders relative to rod 99. One of a pair of discs 104 is fastened to each end of rod 99 to prevent the sliders 103 from traveling off of the rod. The discs 104 are fastened to the rod 99 by disengagable means, such as bolts 106, so that the sliders 103 may be removed from the rod and inverted and then be reinstalled on the rod for purposes which will hereinafter be discussed.

The wire guide 92 is required to provide opposite functions during the two different modes of operation. The guide 56d acts to hold the wire 22d up at a point in front of the cutting element 29d when small diameter wire is being processed as depicted in FIG. 16. The guide 56d must hold the wire 22d down during the large wire mode of operation shown in FIG. 17. Referring to FIG. 15, two different wire engaging members 107 and 108 extend outward from each slider 103 in opposite directions to provide for the two different modes of operation.

The first type of wire engaging member 107, shown extending upward in FIG. 15, is used for small wire stripping and is a U-shaped member which is open at the top to form a groove through which the wire may travel. The other type of wire engaging member 108, shown extending down from the sliders 103 is hook shaped. The sliders 103 are positioned with the U-shaped wire engaging members 107 at the top, as shown in FIG. 16, during small wire processing. The wire 22d is then traveled through the wire engaging member 107 which then bear against the underside of the wire 22d. During large wire processing as shown in FIG. 17, the sliders 103 are inverted and the hook shaped wire engaging members 108 then extend upward to engage the wire 22d and act to hold the wire down. In this mode of operation, the jointed arms 101 are adjusted to locate the wire engaging members 108 below the level of the cutting element 29d.

While the invention has been described with respect to certain specific embodiments for purposes of example, many other variations in the construction are possible within the scope of the invention and it is not intended to limit the invention except as defined in the following claims.

I claim:

1. Apparatus for removing insulation or other sheathing from the core of a wire, cable or the like comprising:
   a rotatable drum for receiving said core following removal of said insulation or other sheathing therefrom
   drive means for turning said drum to wind said core thereon, a cutting element having at least one notch through which said wire, cable or the like may extend as said wire, cable or the like is fed towards said drum, said notch having a cutting edge proportioned to cut said insulation or other sheathing into two strip portions thereof as said core travels through said notch, said cutting edge being shaped to peel one portion of the cut insulation or other sheathing away from the other portion thereof, and cutting element support means for enabling movement of said cutting element in a direction parallel to the axis of rotation of said drum as said core is being wound thereon.

2. The apparatus of claim 1 wherein said cutting element is a linear bar having said notch in an edge thereof, said cutting element being spaced from said drum and being oriented in substantially parallel relationship with said axis of rotation thereof.

3. The apparatus of claim 2 wherein said cutting element has a length which is at least twice the length of the region of said drum on which said core is wound.

4. The apparatus of claim 1 further including a first cross member extending in parallel relationship with said said axis of rotation and being situated between said cutting element and said drum in position to contact said core as said core travels from said cutting element to said drum, said first cross member being spaced from said cutting element to enable said core to travel therebetween.

5. The apparatus of claim 4 further including a second cross member extending in parallel relationship with said axis of rotation between said cutting element and said drum and being spaced apart from said first rod in position to contact the side of said core that is opposite from the side of said core that is contacted by said first rod.

6. The apparatus of claim 4 further including a pair of cross member supports which are spaced apart and adjacent opposite end regions of said cutting element, each of said cross member supports having a plurality of spaced apart openings in which an end region of said cross member may be received, said openings being at different distances from said cutting element.

7. The apparatus of claim 4 further including cross member positioning means for enabling movement of said cross member away from said cutting element, and resilient means for resisting said movement.

8. The apparatus of claim 7 wherein said cross member has a pair of spaced apart openings therethrough, and wherein said positioning means includes a pair of spaced apart support rods having end portions extending through said openings of said cutting element, and wherein said resilient means includes a pair of compression springs each being disposed in coaxial relationship with a separate one of said support rods and which bias said cross member towards a predetermined position at which said cross member has a minimum spacing from said cutting element.

9. The apparatus of claim 7 wherein said cutting element and said cross member extend horizontally and wherein said cross member is a curved plate that also extends downwardly and forwardly under said cutting element, and wherein said positioning means enables pivoting of said plate away from said cutting element, said resilient means including at least one spring arranged to resist said pivoting movement of said plate.

10. The apparatus of claim 1 wherein said support means includes first and second cutting element guides situated at said spaced apart locations at opposite sides of said notch, each of said guides having a slot through which said cutting element extends, said cutting element being slidable relative to said guides and said slots in said direction parallel to said axis of rotation of said drum.

11. The apparatus of claim 1 wherein said cutting element has a plurality of said notches.

12. The apparatus of claim 11 wherein at least a portion of said plurality of notches are notches of different sizes.

13. The apparatus of claim 12 wherein said cutting element is a linear bar which extends in parallel relationship with said axis of rotation of said drum and wherein a first portion of said notches are on one edge of said bar and another portion of said notches are on the opposite edge of said bar.

14. The apparatus of claim 1 wherein said cutting element is a horizontally extending bar, further including a chute disposed below said cutting element in position to receive insulation or sheathing which is stripped from said wire cable or the like, said chute having a curved surface oriented to guide said insulation or sheathing downward and outward from said apparatus.

15. The apparatus of claim 1 further including a support frame having said rotatable drum journalled thereto and having said cutting element mounted thereon by said cutting element support means, and wherein said drive means includes a motor secured to said support frame and means for transmitting rotary drive from said motor to said drum.

16. The apparatus of claim 15 having a spaced apart pair of said rotatable drums disposed for rotation about said axis and wherein said means for transmitting rotary drive includes a drive shaft journalled to said support frame and extending along said axis of rotation and engaging each of said pair of drums, said cutting element being a linear bar of sufficient length to extend in front of both of said drums and which has a plurality of said notches including at least one notch situated in front of each of said drums.

17. The apparatus of claim 16 wherein said pair of drums are spaced apart along said axis and wherein said cutting element support means is a sleeve through which said cutting element extends, said sleeve being in front of the region between said drums.

18. The apparatus of claim 1 wherein said cutting element is a horizontally extending bar disposed in parallel relationship with the axis of rotation of said drum and having said notch in an edge of said bar, further including wire guide means for exerting downward pressure on the top of said wire at a location in front of said cutting element at times when said wire is traveled over said cutting element and for exerting upward pressure on the underside of said wire at times when said wire is traveled under said cutting element.

19. The apparatus of claim 18 wherein said wire guide means includes a cross rod extending in parallel relationship with said cutting element at a location in front thereof, a slider element on said rod which may travel therealong, said slider element having a U-shaped wire engaging member secured to one side thereof and forming a groove through which said wire may be traveled towards the underside of said cutting element and having a hook shaped wire engaging element through which said wire may be traveled towards the top surface of said cutting element, and means for selectively reorienting said slider element on said rod to enable said U-shaped wire engaging member to be directed towards said wire at one orientation of said slider element and to enable said hook shaped wire engaging element to be directed towards said wire at a second orientation of said slider element.

20. The apparatus of claim 19 further including means for selectively raising and lowering the location of said slider element.

21. The apparatus of claim 18 further including a lower sheathing deflector plate disposed below said cutting element and having a front surface positioned to guide severed sheathing towards the front of said apparatus, the upper edge of said lower sheathing plate being pivotable towards said cutting element and away therefrom, spring means for resisting movement of said upper edge away from said cutting element, and an upper sheathing deflector plate disposed above said cutting element and having a front surface positioned to guide severed sheathing towards the front of said apparatus, said upper sheathing deflector plate having a lower edge positioned ride on the top of the core of said wire to separate the upper portion of the severed sheating therefrom following passage of said wire through said notch.

22. The apparatus of claim 21 further including support structure for said upper sheathing deflector plate which includes a first vertically directed support member having said upper deflector plate secured thereto, and a second vertically directed support member disposed in telescoping relationship with said first support member enabling vertical movement of said upper deflector member relative to said second support member.

23. Apparatus for stripping insulation or the like from electrical wire or the like, comprising:
   a support frame supporting a rotatable drive shaft,
   a drive motor secured to said frame and being coupled to said drive shaft to turn said shaft,
   a cylindrical drum disposed in coaxial relationship with said drive shaft for rotation therewith to enable winding of said wire or the like onto said drum,
   a linear cutting element spaced apart from said drum and extending in parallel relationship with said drum, said cutting element having at least one notch defining a cutting edge, said notch being shaped to receive said wire or the like as it travels towards said drum and to cut said insulation therefrom, and
   means for supporting said linear cutting element while enabling longitudinal sliding movement of said element in response to forces exerted on said element through said electrical wire or the like.

* * * * *